(12) United States Patent
Suzuki

(10) Patent No.: US 9,995,226 B2
(45) Date of Patent: Jun. 12, 2018

(54) CONTROL DEVICE FOR VEHICLE

(71) Applicant: Toyota Jidosha Kabushiki Kaisha, Toyota-shi, Aichi-ken (JP)

(72) Inventor: Takashi Suzuki, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 255 days.

(21) Appl. No.: 14/922,685

(22) Filed: Oct. 26, 2015

(65) Prior Publication Data

US 2016/0146129 A1    May 26, 2016

(30) Foreign Application Priority Data

Nov. 25, 2014   (JP) .................. 2014-237847

(51) Int. Cl.
| | | |
|---|---|---|
| F02D 41/00 | (2006.01) | |
| F02D 41/30 | (2006.01) | |
| F02D 41/06 | (2006.01) | |
| B60W 20/00 | (2016.01) | |
| B60K 6/365 | (2007.10) | |
| B60K 6/445 | (2007.10) | |

(Continued)

(52) U.S. Cl.
CPC .......... *F02D 41/0002* (2013.01); *B60K 6/365* (2013.01); *B60K 6/445* (2013.01); *B60W 20/00* (2013.01); *B60W 20/16* (2016.01); *F02D 41/062* (2013.01); *F02D 41/3005* (2013.01); *F02D 41/3082* (2013.01); *B60W 10/06* (2013.01); *B60W 2540/10* (2013.01); *B60W 2710/0605* (2013.01); *B60W 2710/0622* (2013.01); *F02D 2200/0602* (2013.01); *Y02T 10/42* (2013.01)

(58) Field of Classification Search
CPC ............... F02D 41/0002; F02D 41/062; F02D 41/3005; F02D 41/3082; F02D 2200/0602; B60W 20/00; Y02T 10/42
See application file for complete search history.

(56) References Cited

U.S. PATENT DOCUMENTS

| | | | |
|---|---|---|---|
| 7,281,509 B2 * | 10/2007 | Fukui .................. | F02D 41/062 123/179.16 |
| 2006/0060162 A1 * | 3/2006 | Fukui .................. | F02D 41/062 123/179.16 |

(Continued)

FOREIGN PATENT DOCUMENTS

| | | |
|---|---|---|
| JP | H11200907 A | 7/1999 |
| JP | 2009-269430 A | 11/2009 |

(Continued)

*Primary Examiner* — Stephen K Cronin
*Assistant Examiner* — Susan Scharpf
(74) *Attorney, Agent, or Firm* — Dinsmore & Shohl LLP

(57) ABSTRACT

A control device causes the engine to start with a throttle valve being set to a first throttle position when required power required in an engine is smaller than a first threshold value and a detected fuel pressure detected by a low-pressure fuel sensor is lower than a second threshold value. The control device causes the engine to start with the throttle valve being set to a position larger than the first throttle position when the required power is smaller than the first threshold value and the detected fuel pressure is higher than the second threshold value. With this structure, a control device for a vehicle can be provided which allows intermittent operation of the engine with reduced variation in air-fuel ratio.

3 Claims, 5 Drawing Sheets

(51) Int. Cl.
*B60W 20/16* (2016.01)
*B60W 10/06* (2006.01)

(56) References Cited

U.S. PATENT DOCUMENTS

| | | | |
|---|---|---|---|
| 2006/0207561 A1* | 9/2006 | Kinose | F02D 41/062 |
| | | | 123/431 |
| 2006/0254562 A1* | 11/2006 | Akita | B60K 6/445 |
| | | | 123/431 |
| 2011/0162622 A1* | 7/2011 | Kojima | F02D 41/062 |
| | | | 123/457 |
| 2012/0318237 A1* | 12/2012 | Tsukagoshi | F02D 41/0025 |
| | | | 123/445 |
| 2013/0151052 A1* | 6/2013 | Fukuzawa | B60W 20/00 |
| | | | 701/22 |
| 2013/0213362 A1* | 8/2013 | Chiba | F02M 43/04 |
| | | | 123/478 |
| 2013/0247874 A1* | 9/2013 | Saito | F02D 41/3854 |
| | | | 123/446 |

FOREIGN PATENT DOCUMENTS

| | | |
|---|---|---|
| JP | 2011-073474 A | 4/2011 |
| JP | 2011-183918 A | 9/2011 |
| JP | 2012-067634 A | 4/2012 |

\* cited by examiner

CONTROL DEVICE FOR VEHICLE

This nonprovisional application is based on Japanese Patent Application No. 2014-237847 filed on Nov. 25, 2014, with the Japan Patent Office, the entire contents of which are hereby incorporated by reference.

BACKGROUND OF THE INVENTION

Field of the Invention

This invention relates to a control device for a vehicle, and particularly to a control device for a vehicle equipped with an internal combustion engine including port injection valves that inject fuel into an intake passage.

Description of the Background Art

Japanese Patent Laying-Open No. 2011-073474 discloses a hybrid vehicle equipped with an internal combustion engine including port injection valves and in-cylinder injection valves. The document discloses that in this hybrid vehicle, the engine is operated under load when target power to be output from the engine is not smaller than a prescribed value, and the engine is operated on its own or is stopped operating when the target power is smaller than the prescribed value.

For a low pressure fuel system in which fuel is supplied into the port injection valves, the pressure regulator method has been conventionally used. In order to improve fuel efficiency, however, the use of a variable fuel pressure system with less energy loss has been considered.

In the pressure regulator method, the pressure of the fuel is stabilized by excessively pressurizing the fuel with a fuel pump, and discharging part of the fuel through a pipe using a pressure regulator valve. On the other hand, in the variable fuel pressure system, which has improved accuracy of pressurizing the fuel pump, fuel may be directly supplied to the fuel pipe without using the pressure regulator valve.

In a hybrid vehicle, fuel efficiency is improved by causing the engine to be shut down while the vehicle is stopped, or causing the vehicle to run (EV running) while the engine is shut down. In this way, the engine is used as required. The engine is therefore operated intermittently. Here, the intermittent operation of the engine may cause the fuel pressure in the variable fuel pressure system to rise above an original target value. When the engine is stopped from its operating state, the injection of the fuel from the port injection valves is stopped. At this time, if the timing of stopping the fuel feed pump is late, the fuel pressure is increased above the target value. Furthermore, because the fuel is not discharged from a low-pressure delivery pipe, the fuel stored in the low-pressure delivery pipe may expand due to the absorption of heat from the engine. This may cause the fuel pressure to increase even though the fuel feed pump is stopped.

Under a high fuel pressure, a minimum injection amount of the fuel that can be injected from the port injection valves also increases. When the minimum injection amount is increased, the injection amount during operation with a small amount of air becomes excessive relative to the amount of air. As a result, the air-fuel ratio becomes fuel-rich to cause exhaust deterioration. This operation with a small amount of air tends to occur at the start of the engine during the intermittent operation of the engine.

SUMMARY OF THE INVENTION

An object of this invention is to provide a control device for a vehicle which allows intermittent operation of the engine with reduced variation in air-fuel ratio.

This invention relates to a control device for a vehicle equipped with an internal combustion engine. The internal combustion engine includes a port injection valve that injects fuel into an intake passage, a fuel tank that stores the fuel to be injected from the port injection valve, a feed pump that sucks the fuel from the fuel tank and supplies the fuel to the port injection valve, and a throttle valve that is provided along the intake passage to adjust an amount of air. The control device includes a fuel pressure sensor that detects a pressure of the fuel supplied to the port injection valve, and a control unit that controls the feed pump based on a detected value from the fuel pressure sensor. The control unit changes a throttle position at the start of the internal combustion engine, in accordance with the fuel pressure detected by the fuel pressure sensor at the start of the internal combustion engine.

Preferably, when required power required in the internal combustion engine is smaller than a first threshold value and the detected fuel pressure detected by the fuel pressure sensor is lower than a second threshold value, the control unit causes the internal combustion engine to start with the throttle valve being set to a first throttle position. When the required power is smaller than the first threshold value and the detected fuel pressure is higher than the second threshold value, the control unit causes the internal combustion engine to start with the throttle valve being set to a position larger than the first throttle position.

With the above-described structure, normally, the throttle position can be set low to reduce vibrations at the start of the internal combustion engine, while in cases where the required power is high or the fuel pressure is high, the throttle position can be set high to allow responsive output of the required power to the engine or prevention of exhaust deterioration.

Preferably, when the power required in the internal combustion engine is greater than the first threshold value, the control unit causes the internal combustion engine to start with the throttle valve being set to a position larger than the first throttle position and corresponding to the power required in the internal combustion engine.

Preferably, the vehicle includes a motor, and can run with the motor while the internal combustion engine is stopped. The control unit causes intermittent operation of the internal combustion engine while the vehicle is running, and at the start of the internal combustion engine during the intermittent operation, changes the throttle position at the start of the internal combustion engine in accordance with the fuel pressure.

According to the invention, the engine can be operated intermittently with reduced variation in air-fuel ratio.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
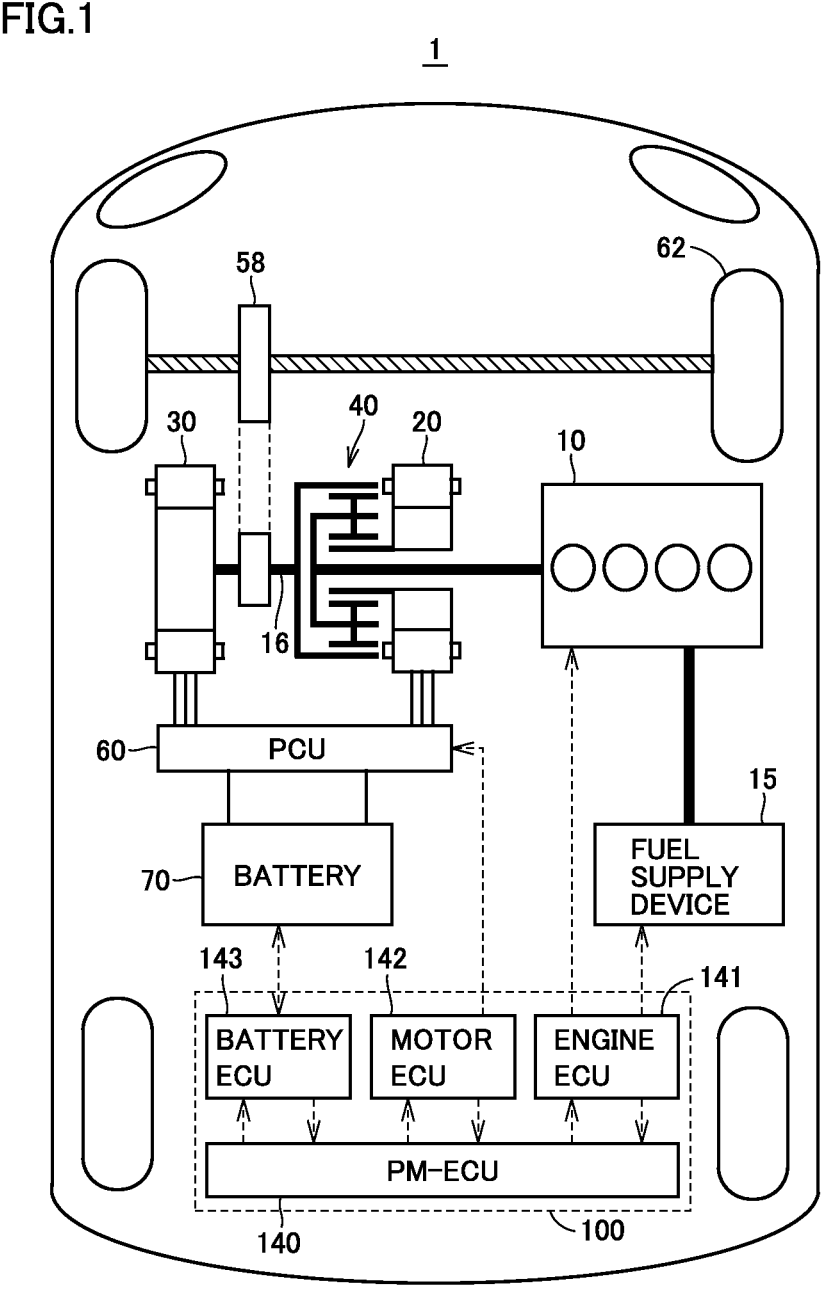
FIG. 1 is a block diagram showing the configuration of a hybrid vehicle 1 to which the present invention is applied.

Embodiments of the present invention will be described below in detail with reference to the drawings, in which the same or corresponding elements are designated by the same reference characters, and description thereof will not be repeated.

(Description of Basic Configuration)

FIG. 1 is a block diagram showing the configuration of hybrid vehicle 1 to which the present invention is applied. Referring to FIG. 1, hybrid vehicle 1 includes engine 10, fuel supply device 15, motor generators 20 and 30, a power split device 40, a reduction mechanism 58, a driving wheel 62, a power control unit (PCU) 60, a battery 70, and a control device 100.

Hybrid vehicle 1 is a series/parallel-type hybrid vehicle, and is configured to be capable of running using at least one of engine 10 and motor generator 30 as a driving source.

Engine 10, motor generator 20, and motor generator 30 are coupled to one another via power split device 40. Reduction mechanism 58 is connected to a rotation shaft 16 of motor generator 30, which is coupled to power split device 40. Rotation shaft 16 is coupled to driving wheel 62 via reduction mechanism 58, and is coupled to a crankshaft of engine 10 via power split device 40.

Power split device 40 is capable of splitting the driving force of engine 10 for motor generator 20 and rotation shaft 16. Motor generator 20 can function as a starter for starting engine 10 by rotating the crankshaft of engine 10 via power split device 40.

Motor generators 20 and 30 are both well-known synchronous generator motors that can operate both as power generators and electric motors. Motor generators 20 and 30 are connected to PCU 60, which in turn is connected to battery 70.

Control device 100 includes an electronic control unit for power management (hereinafter referred to as "PM-ECU") 140, an electronic control unit for the engine (hereinafter referred to as "engine ECU") 141, an electronic control unit for the motors (hereinafter referred to as "motor ECU") 142, and an electronic control unit for the battery (hereinafter referred to as "battery ECU") 143.

PM-ECU 140 is connected to engine ECU 141, motor ECU 142, and battery ECU 143, via a communication port (not shown). PM-ECU 140 exchanges various control signals and data with engine ECU 141, motor ECU 142, and battery ECU 143.

Motor ECU 142 is connected to PCU 60 to control driving of motor generators 20 and 30. Battery ECU 143 calculates a remaining capacitance (hereinafter referred to as SOC (State of Charge)), based on an integrated value of charge/discharge current of battery 70.

Engine ECU 141 is connected to engine 10 and fuel supply device 15. Engine ECU 141 receives input of signals from various sensors that detect an operation state of engine 10, and performs operation control such as fuel injection control, ignition control, intake air amount regulation control, and the like, in response to the input signals. Engine ECU 141 also controls fuel supply device 15 to supply fuel to engine 10.

In hybrid vehicle 1 having the above-described configuration, the configuration and control of engine 10 and fuel supply device 15 will be described in more detail.

Figure 2:
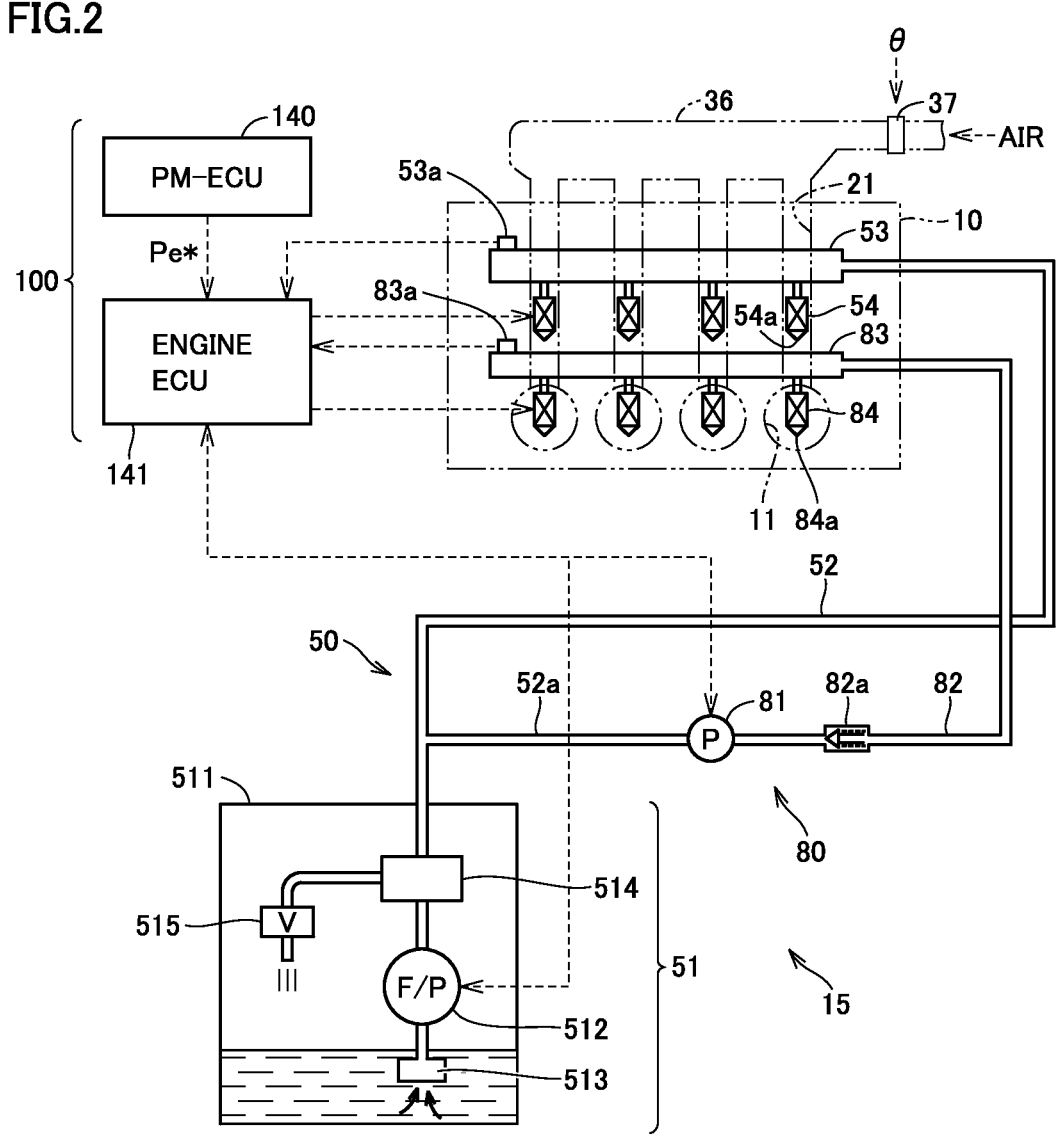
FIG. 2 is a diagram showing the configuration of an engine 10 and a fuel supply device 15 concerning fuel supply.

FIG. 2 is a diagram showing the configuration of engine 10 and fuel supply device 15 concerning fuel supply. In this embodiment, the vehicle to which the invention is applied is a hybrid vehicle that adopts, as an internal combustion engine, a dual injection-type internal combustion engine using both in-cylinder injection and port injection, for example, a serial four-cylinder gasoline engine.

Referring to FIG. 2, engine 10 includes an intake manifold 36, an intake port 21, and four cylinders 11 provided in a cylinder block.

When a piston (not shown) is lowered in each cylinder 11, intake air AIR flows into each cylinder 11 from an intake port pipe by way of intake manifold 36 and intake port 21.

Fuel supply device 15 includes a low-pressure fuel supply mechanism 50 and a high-pressure fuel supply mechanism 80. Low-pressure fuel supply mechanism 50 includes a fuel pumping section 51, a low-pressure fuel pipe 52, low-pressure delivery pipe 53, low-pressure fuel sensor 53a, and port injection valves 54.

High-pressure fuel supply mechanism 80 includes a high-pressure pump 81, a check valve 82a, a high-pressure fuel pipe 82, a high-pressure delivery pipe 83, a high-pressure fuel sensor 83a, and in-cylinder injection valves 84.

Each in-cylinder injection valve 84 is an injector for in-cylinder injection having an nozzle hole 84a exposed within the combustion chamber of each cylinder 11. During a valve-opening operation of each in-cylinder injection valve 84, fuel pressurized within high-pressure delivery pipe 83 is injected into combustion chamber 16 from nozzle hole 84a of in-cylinder injection valve 84.

Engine ECU 141 is configured to include a CPU (Central Processing Unit), a ROM (Read Only Memory), a RAM (Random Access Memory), an input interface circuit, an output interface circuit, and the like. Engine ECU 141 controls engine 10 and fuel supply device 15 in response to an engine start/shutdown command from PM-ECU shown in FIG. 1.

Engine ECU 141 calculates a fuel injection amount required for every combustion cycle based on the accelerator pedal position, the intake air amount, the engine speed, and the like. Engine ECU 141 also outputs an injection command signal or the like to each port injection valve 54 and each in-cylinder injection valve 84, at an appropriate time, based on the fuel injection amount calculated.

At the start of engine 10, engine ECU 141 causes port injection valves 54 to perform fuel injection first. ECU 140 then begins to output an injection command signal to each in-cylinder injection valve 84 when the fuel pressure within high-pressure delivery pipe 83 detected by high-pressure fuel sensor 83a has exceeded a preset pressure value.

Furthermore, while engine ECU 141 basically uses in-cylinder injection from in-cylinder injection valves 84, for example, it also uses port injection under a specific operation state in which in-cylinder injection does not allow sufficient formation of an air-fuel mixture, for example, during the start and the warm-up of engine 10, or during rotation of engine 10 at low speed and high load. Alternatively, while engine ECU 141 basically uses in-cylinder injection from in-cylinder injection valves 84, for example, it also causes port injection from port injection valves 54 to be performed when port injection is effective, for example, during rotation of engine 10 at high speed and low load.

In this embodiment, fuel supply device 15 has a feature in that the pressure of low-pressure fuel supply mechanism 50 is variably controllable. Low-pressure fuel supply mechanism 50 of fuel supply device 15 will be described below in more detail.

Fuel pumping section 51 includes a fuel tank 511, a feed pump 512, a suction filter 513, a fuel filter 514, and a relief valve 515.

Fuel tank 511 stores a fuel consumed by engine 10, for example, gasoline. Suction filter 513 prevents suction of foreign matter. Fuel filter 514 removes foreign matter contained in discharged fuel.

Relief valve 515 opens when the pressure of the fuel discharged from feed pump 512 reaches an upper limit pressure, and remains closed while the pressure of the fuel is below the upper limit pressure.

Low-pressure fuel pipe 52 connects from fuel pumping section 51 to low-pressure delivery pipe 53. Note, however, that low-pressure fuel pipe 52 is not limited to a fuel pipe, and may also be a single member through which a fuel passage is formed, or may be a plurality of members having a fuel passage formed therebetween.

Low-pressure delivery pipe 53 is connected to low-pressure fuel pipe 52 on one end thereof in a direction of the arrangement of cylinders 11 in series. Port injection valves 54 are connected to low-pressure delivery pipe 53. Low-pressure delivery pipe 53 is equipped with low-pressure fuel sensor 53a that detects an internal fuel pressure.

Each port injection valve 54 is an injector for port injection having a nozzle hole 54a exposed within intake port 21 corresponding to each cylinder 11. During a valve-opening operation of each port injection valve 54, fuel pressurized within low-pressure delivery pipe 53 is injected into intake port 21 from nozzle hole 54a of port injection valve 54.

Feed pump 512 is driven or stopped based on a command signal sent from engine ECU 141.

Feed pump 512 is capable of pumping up fuel from fuel tank 511, and pressurizing the fuel to a pressure in a certain variable range of less than 1 [MPa: megapascal], for example, and discharging the fuel. Feed pump 512 is also capable of changing the amount of discharge [m³/sec] and the discharge pressure [kPa: kilopascal] per unit time, under the control of engine ECU 141.

This control of feed pump 512 is preferable in the following respects. Firstly, in order to prevent gasification of the fuel inside low-pressure delivery pipe 53 when the engine is heated to a high temperature, it is necessary to exert a pressure on low-pressure delivery pipe 53 beforehand such that the fuel does not gasify. An excessive pressure, however, will cause a great load on the pump, leading to a large energy loss. Since the pressure for preventing gasification of the fuel changes depending on the temperature, energy loss can be reduced by exerting a required pressure on low-pressure delivery pipe 53. Secondly, wasteful consumption of energy for pressurizing the fuel can be reduced by controlling feed pump 512 appropriately to deliver an amount of fuel corresponding to an amount of fuel consumed by the engine. This is advantageous in that the fuel efficiency is improved over a configuration in which the fuel is excessively pressurized and then the fuel pressure is adjusted to be constant with a pressure regulator.

[Engine Start Control when Fuel Pressure Varies]

In the hybrid vehicle equipped with the internal combustion engine described above, the injection amount of fuel from port injection valves 54 is basically determined by the fuel pressure and the open time (=energizing time) of port injection valves 54. However, because port injection valves 54 are needle valves, the linearity of the injection amount characteristics is lost when the energizing time is short. In order to accurately control the injection amount, therefore, the use of port injection valves 54 in a range where the energizing time is short is avoided. The injection characteristics of port injection valves 54 are also affected by fuel pressure.

Figure 3:
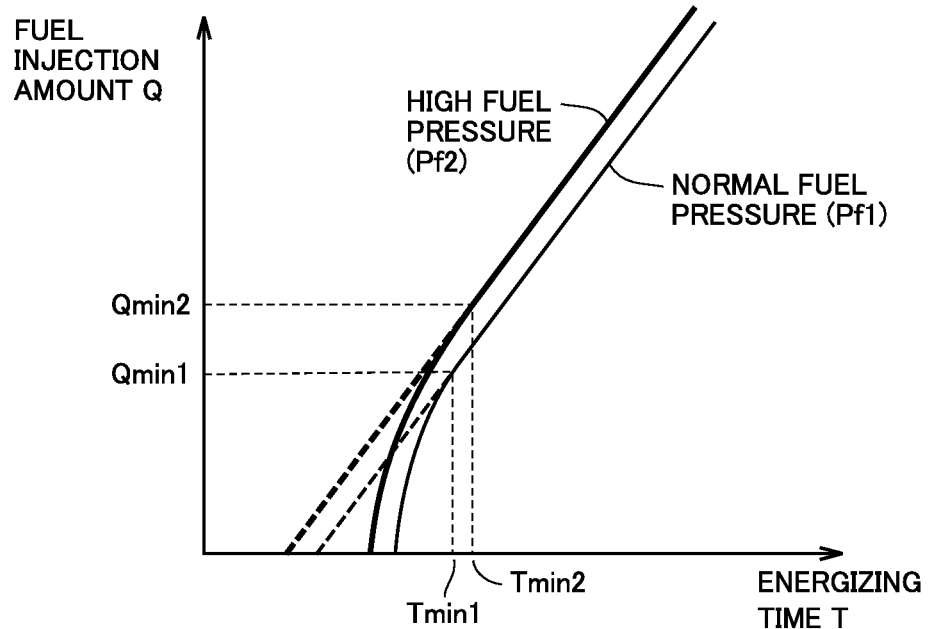
FIG. 3 is a diagram for explaining how the fuel pressure affects injection characteristics of port injection valves 54.

FIG. 3 is a diagram for explaining how the fuel pressure affects the injection characteristics of port injection valves 54. Referring to FIG. 3, the horizontal axis represents the energizing time for port injection valves 54, and the vertical axis represents the fuel injection amount.

When the fuel pressure has a normal value (Pf1), the relation between the energizing time and fuel injection amount Q is linear in a range where energizing time T is not shorter than Tmin1. Port injection valves 54 can thus inject a minimum injectable amount Qmin1 of fuel at energizing time Tmin1.

On the other hand, when the fuel pressure has a high value (Pf2), the relation between the energizing time and fuel injection amount Q is linear in a range where energizing time T is not shorter than Tmin2. Port injection valves 54 can thus inject a minimum injectable amount Qmin2 of fuel at energizing time Tmin2.

That is, when the fuel pressure increases, the minimum injectable amount increases from Qmin1 to Qmin2. Therefore, when the fuel pressure is high, if engine 10 is operated with a small amount of air, the air-fuel ratio may deviate from stoichiometry (theoretical air-fuel ratio) to the fuel-rich side, leading to exhaust deterioration.

Here, there is a concern that the air-fuel ratio may deteriorate particularly at the start of the engine during the intermittent operation of the engine. At this time, when the accelerator pedal position is large, the throttle position is increased in favor of acceleration, and the engine is started with a large amount of air. This start will be hereinafter referred to as the "Pe start". In contrast, when the accelerator pedal position is small, in favor of reducing vibrations, the throttle position is reduced to a position corresponding to idling during which the engine is operated on its own without outputting a torque, and the engine is started with a small amount of air. This start will be hereinafter referred to as the "self-start".

If, however, the engine is operated on its own under a high fuel pressure, the air-fuel ratio will deviate to the fuel-rich side with a small amount of air, resulting in exhaust deterioration.

In this embodiment, therefore, when the fuel pressure is high, the engine is started by the Pe start even in cases where conventionally the engine has been started by the self-start.

Figure 4:
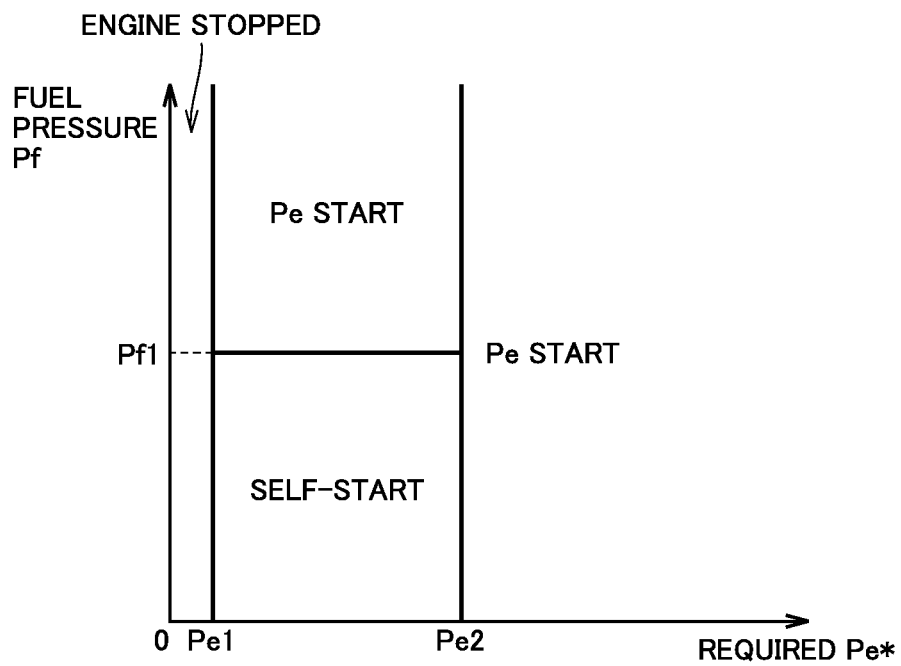
FIG. 4 is a diagram for explaining differentiation between the case where the self-start is performed and the case where the Pe start is performed according to an embodiment of the invention.

FIG. 4 is a diagram for explaining differentiation between the case where the self-start is performed and the case where the Pe start is performed according to an embodiment of the invention. In FIG. 4, the horizontal axis represents engine required power Pe*, and the vertical axis represents fuel pressure Pf. A threshold value Pf1 is used for fuel pressure, and threshold values Pe1, Pe2 are used for engine required power Pe*, for differentiation between the case where the self-start is performed and the case where the Pe start is performed.

As shown in FIG. 4, when Pe*<Pe1, engine 10 is stopped. When Pe*>Pe2, engine 10 is started by the Pe start.

In the range where Pe1<Pe*<Pe2, depending on the magnitude of fuel pressure Pf, it is determined whether the engine is to be operated on its own or to be started by the Pe start with an increased amount of air. In the range where Pe1<Pe*<Pe2 and Pf<Pf1, the engine is started by the self-start. In the range where Pe1<Pe*<Pe2 and Pf>Pf1, the engine is started by the Pe start.

Note that on the boundary between the self-start and the Pe start, the engine may be started using either of the self-start and the Pe start.

Figure 5:
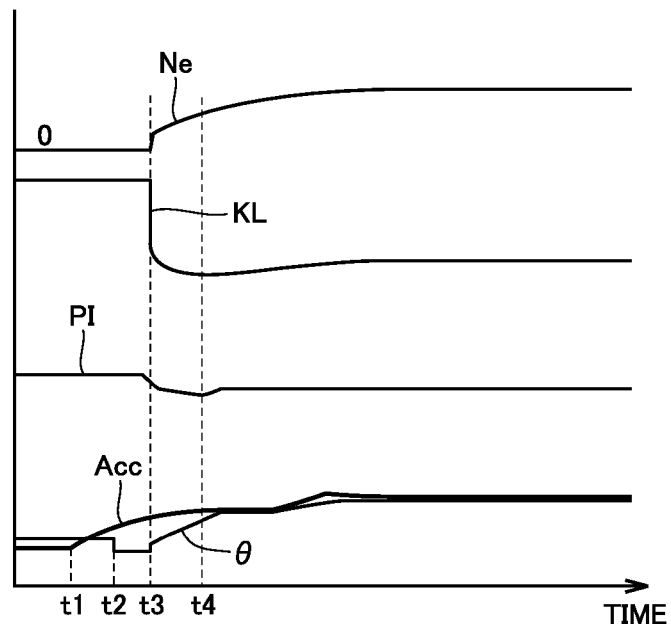
FIG. 5 is an operation waveform diagram when the engine is started by the Pe start.
Figure 6:
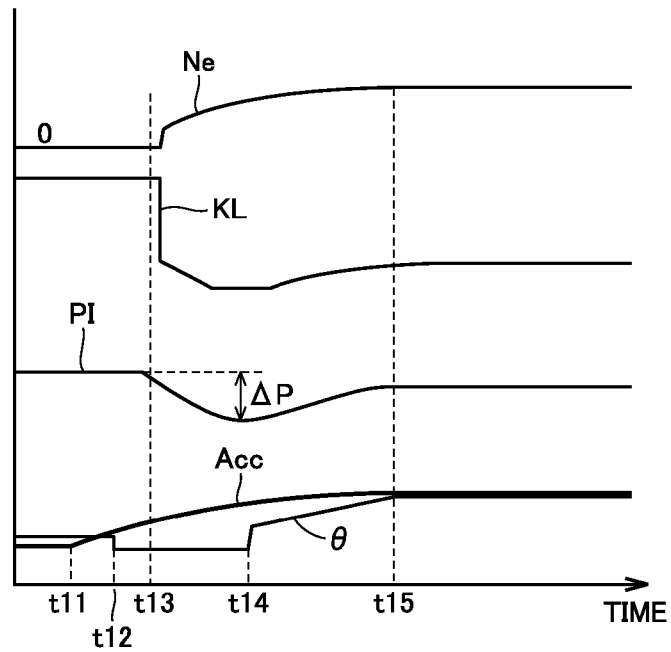
FIG. 6 is an operation waveform diagram when the engine is started by the self-start.

The Pe start and the self-start will be described through a comparison of their operation waveforms. FIG. 5 is an operation waveform diagram when the engine is started by the Pe start. FIG. 6 is an operation waveform diagram when the engine is started by the self-start. In each of FIGS. 5 and 6, the horizontal axis represents time, and in order from the top, engine rotation speed Ne, air load rate KL, intake pipe internal pressure PI, accelerator pedal position Acc, and throttle position θ are shown.

In the case of the Pe start shown in FIG. 5, at time t1, accelerator pedal position Acc begins to increase, and correspondingly at time t2, throttle position θ is reduced once, in order to reduce the pumping loss during engine cranking, and reduce vibrations. At time t3, engine rotation speed Ne begins to increase due to cranking, while air load rate KL decreases. Then, over the period from time t3 to t4, accelerator pedal position θ increases at a prescribed speed, and from time t4 and thereafter, control is performed such that throttle position θ changes with the change in accelerator pedal position Acc.

On the other hand, in the case of the self start shown in FIG. 6, at time t11, accelerator pedal position Acc begins to increase, and correspondingly at time t12, throttle position θ is reduced once, in order to reduce the pumping loss during engine cranking, and reduce vibrations. This state of reduced throttle position θ is continued until time t14 for reducing vibrations. Meanwhile, at time t13, engine rotation speed Ne begins to increase due to cranking, while air load rate KL decreases. Then, over the period from time t14 to t15, accelerator pedal position θ increases slower than in the case of the Pe start, and from time t15 and thereafter, control is performed such that throttle position θ changes with the change in accelerator pedal position Acc.

Here, it is seen that in the case of the Pe start shown in FIG. 5, intake pipe internal pressure PI does not decrease significantly, whereas in the case of the self-start shown in FIG. 6, an amount of decrease ΔP is comparatively large. If the fuel injection amount then is excessive, the air-fuel ratio tends to deviate to the fuel-rich side. In this embodiment, therefore, in the case of a high fuel pressure, which is difficult to control in a range where the fuel injection amount is small, the Pe start is performed with an increased amount of air, rather than performing the self-start.

Figure 7:
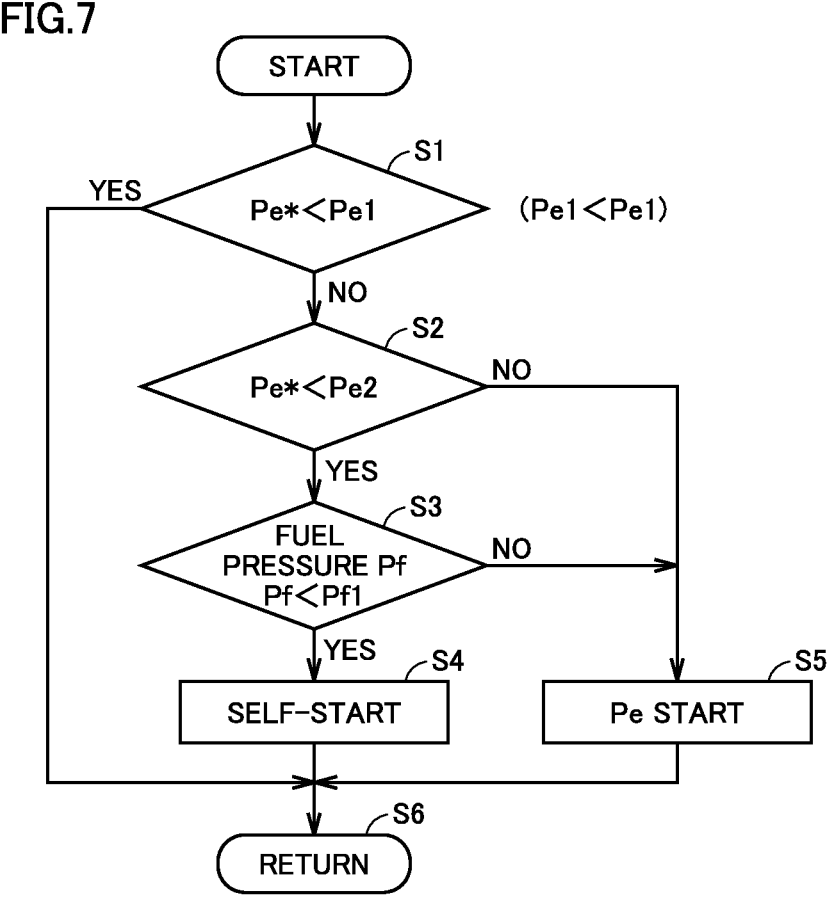
FIG. 7 is a flowchart for explaining processing for determining whether or not the engine is to be started, and for determining whether the self-start or the Pe start is to be performed at the start of the engine.

FIG. 7 is a flowchart for explaining processing for determining whether or not the engine is to be started, and for determining whether the self-start or the Pe start is to be performed at the engine start. The processing in this flowchart is invoked from a prescribed main routine at certain intervals or every time a prescribed condition is met, and then executed.

Referring to FIG. 7, first in step S1, control device 100 determines whether or not engine required power Pe* is smaller than first threshold value Pe1.

When Pe*<Pe1 in step S1 (YES in S1), the engine is not started, and the processing proceeds to step S6. When Pe*<Pe1 does not hold in step S1 (NO in S1), the engine is started, while the processing proceeds to step S2 to determine the starting method.

In step S2, control device 100 determines whether or not engine required power Pe* is smaller than second threshold value Pe2. When Pe*<Pe2 in step S2 (YES in S2), the processing proceeds to step S3. When Pe*<Pe2 does not hold in step S2 (NO in S2), the processing proceeds to S5 where engine 10 is started by the Pe start.

Next, in step S3, control device 100 determines whether or not fuel pressure Pf detected by low-pressure fuel sensor 53a is smaller than first threshold value Pf1. When Pf<Pf1 in step S3 (YES in S3), the processing proceeds to step S4 where engine 10 is started by the self-start. On the other hand, when Pf<Pf1 does not hold in step S3 (NO in S3), the processing proceeds to S5 where engine 10 is started by the Pe start.

After the starting method is determined in step S4 or step S5, the processing proceeds to step S6 where the control is returned to the main routine.

Through the execution of the control shown in FIG. 7 described above, the cases where the two starting methods are used can be differentiated from each other, as shown in FIG. 4. In this way, the deviation of the air-fuel ratio when the fuel pressure is high can be avoided, and deterioration of the exhaust gas can be prevented.

Lastly, a summary of this embodiment will be provided referring to the drawings again. Referring to FIG. 2, this embodiment relates to a control device for a vehicle equipped with engine 10. Engine 10 includes port injection valves 54 that inject fuel into an intake passage, a fuel tank 511 that stores the fuel to be injected from port injection valves 54, a feed pump 512 that sucks the fuel from fuel tank 511 and supplies the fuel to port injection valves 54, and a throttle valve 37 that is provided along the intake passage to adjust an amount of air. The control device according to this embodiment includes a low-pressure fuel sensor 53a that detects a pressure of the fuel supplied to port injection valves 54, and a control device 100 that controls feed pump 512 based on a detected value from low-pressure fuel sensor 53a. Control device 100 changes a throttle position at the start of engine 10, in accordance with the fuel pressure detected by low-pressure fuel sensor 53a at the start of engine 10.

Preferably, as shown in FIGS. 4 and 7, when required power required in engine 10 is smaller than first threshold value Pe2 and the detected fuel pressure detected by low-pressure fuel sensor 53a is lower than second threshold value Pf1, control device 100 causes engine 10 to start with throttle valve 37 being set to a first throttle position. When the required power is smaller than first threshold value Pe2 and the detected fuel pressure is higher than second threshold value Pf1, control device 100 causes the engine 10 to start with throttle valve 37 being set to a position larger than the first throttle position.

With the above-described structure, normally, the throttle position can be set low to reduce vibrations at the start of engine 10, while in cases where the required power is high or the fuel pressure is high, the throttle position can be set high to allow responsive output of the required power to engine 10 or prevention of exhaust deterioration.

Preferably, as shown in FIGS. 4 and 7, when the power required in engine 10 is greater than the first threshold value, control device 100 causes engine 10 to start with throttle valve 37 being set to a position larger than the first throttle position and corresponding to the power required in engine 10.

Preferably, as shown in FIG. 1, the vehicle includes motor generators 20, 30, and can run with motor generators 20, 30 while engine 10 is stopped. Control device 100 causes intermittent operation of engine 10 while the vehicle is running, and at the start of engine 10 during the intermittent operation, control device 100 changes the throttle position at the start of engine 10 in accordance with the fuel pressure.

Note that although in FIG. 4 the Pe start is used both as the engine starting method in the case where Pf>Pf1 and Pe1<Pe*<Pe2 and as the engine starting method in the case where Pe*>Pe2, the processing used in these cases may not necessarily be the same. Switching between the Pe start and the self-start in the case where Pe1<Pe*<Pe2 is merely an example of control of the position of the throttle valve at the start of engine 10 in accordance with fuel pressure. That is, where Pf>Pf1 and Pe1<Pe*<Pe2, engine 10 may be started with an increased accelerator pedal position and an increased amount of air as compared to those in the case of the self-start, and engine 10 may be started using a starting method different from the Pe start.

Furthermore, although the internal combustion engine having the in-cylinder injection valves and the port injection valves is shown in FIG. 2 by way of example, the present invention is also applicable to an internal combustion engine only with port injection valves without in-cylinder injection valves.

While embodiments of the present invention have been described as above, it should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

What is claimed is:

1. A control device for a vehicle equipped with an internal combustion engine,
    said internal combustion engine including:
    a port injection valve that injects fuel into an intake passage;
    a fuel tank that stores the fuel to be injected from said port injection valve;
    a feed pump that sucks the fuel from said fuel tank and supplies the fuel to said port injection valve; and
    a throttle valve that is provided along said intake passage to adjust an amount of air,
    said control device comprising:
    a fuel pressure sensor that detects a pressure of the fuel supplied to said port injection valve; and
    a control unit that controls said feed pump based on a detected value from said fuel pressure sensor,
    said control unit changing a throttle position at the start of said internal combustion engine, in accordance with the fuel pressure detected by said fuel pressure sensor at the start of said internal combustion engine,
    wherein when required power required in said internal combustion engine is smaller than a first threshold value and the fuel pressure detected by said fuel pressure sensor is lower than a second threshold value, said control unit causes said internal combustion engine to start with said throttle valve being set to a first throttle position, and
    wherein when said required power is smaller than the first threshold value and said detected fuel pressure is higher than the second threshold value, said control unit causes said internal combustion engine to start with said throttle valve being set to a position larger than said first throttle position.

2. The control device for a vehicle according to claim 1, wherein
    when the power required in said internal combustion engine is greater than the first threshold value, said control unit causes said internal combustion engine to start with said throttle valve being set to a position larger than said first throttle position and corresponding to the power required in said internal combustion engine.

3. The control device for a vehicle according to claim 1, wherein
    said vehicle includes a motor, and can run with said motor while said internal combustion engine is stopped, and
    said control unit causes intermittent operation of said internal combustion engine while said vehicle is running, and at the start of said internal combustion engine during said intermittent operation, changes the throttle position at the start of said internal combustion engine in accordance with said fuel pressure.

* * * * *